US008876473B2

(12) United States Patent
Westergaard et al.

(10) Patent No.: US 8,876,473 B2
(45) Date of Patent: Nov. 4, 2014

(54) HINGED CONNECTION APPARATUS FOR SECURING A FIRST WIND TURBINE COMPONENT TO A SECOND

(75) Inventors: Carsten Hein Westergaard, Houston, TX (US); Mark Hancock, Southampton (GB); Srikanth Narasimalu, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 576 days.

(21) Appl. No.: 13/256,366

(22) PCT Filed: Mar. 17, 2010

(86) PCT No.: PCT/GB2010/000475
§ 371 (c)(1),
(2), (4) Date: Dec. 1, 2011

(87) PCT Pub. No.: WO2010/106316
PCT Pub. Date: Sep. 23, 2010

(65) Prior Publication Data
US 2012/0070283 A1 Mar. 22, 2012

Related U.S. Application Data

(60) Provisional application No. 61/160,905, filed on Mar. 17, 2009.

(30) Foreign Application Priority Data

Mar. 20, 2009 (GB) .................................. 0904873.7

(51) Int. Cl.
*F03D 11/00* (2006.01)
*F03D 1/06* (2006.01)

(52) U.S. Cl.
CPC .............. *F03D 1/065* (2013.01); *F05B 2240/30* (2013.01); *F05B 2260/30* (2013.01); *F05B 2260/301* (2013.01); *Y02E 10/721* (2013.01)
USPC ............................................... 416/23; 416/24

(58) Field of Classification Search
CPC ...................... F03D 7/0232; B64C 2027/7283
USPC ...................... 416/23, 24, 62, 146 R; 244/215
See application file for complete search history.

(56) References Cited

U.S. PATENT DOCUMENTS 2,445,399 A 7/1948 Johnson
2,932,473 A 4/1960 Kass et al.
(Continued)

FOREIGN PATENT DOCUMENTS

EP 0 450 239 10/1991
EP 1 995 455 11/2008
(Continued)

OTHER PUBLICATIONS

James Paddock; Combined Search and Examination Report issued in priority Great Britain Application No. GB0904873.7; Jul. 20, 2009; 2 pages; Great Britain Intellectual Property Office.
(Continued)

*Primary Examiner* — Ninh H Nguyen
(74) *Attorney, Agent, or Firm* — Wood, Herron & Evan, LLP

(57) ABSTRACT

A hinged connection apparatus is described for securing a first wind turbine component to a second. The first wind turbine component may be a wind turbine blade (10) and the second wind turbine component may be a control surface such as an aileron (11). The first or second wind turbine component comprises at least one hinge housing in which a hinge pin (16, 26) is retained. The hinge pin (16, 26) may be extended from a retracted position into an extended position in which it engages with a hinge recess on the other wind turbine component to form a connection. A locking mechanism is provided for securing the hinge pin in place. The hinge pin may be extended manually or automatically by an actuator.

14 Claims, 5 Drawing Sheets

(56) References Cited

U.S. PATENT DOCUMENTS

| | | | |
|---|---|---|---|
| 3,883,093 | A | 5/1975 | Violleau |
| 4,178,657 | A | 12/1979 | Way, Jr. |
| 5,096,378 | A | 3/1992 | Jamieson |
| 5,320,491 | A | 6/1994 | Coleman et al. |
| 5,570,859 | A | 11/1996 | Quandt |
| 5,626,312 | A | 5/1997 | Head |
| 5,722,616 | A | 3/1998 | Durand |
| 6,499,690 | B1 * | 12/2002 | Katayama et al. .......... 244/17.11 |
| 6,508,439 | B1 | 1/2003 | Fink et al. |
| 6,663,345 | B2 * | 12/2003 | Lorkowski et al. ............. 416/23 |
| 6,863,239 | B2 * | 3/2005 | Terpay ........................ 244/17.11 |
| 2003/0080246 | A1 | 5/2003 | Koizumi et al. |

FOREIGN PATENT DOCUMENTS

| | | |
|---|---|---|
| FR | 2 826 066 | 12/2002 |
| FR | 2 863 320 | 6/2005 |
| GB | 2 039 593 | 8/1980 |
| GB | 2 227 286 | 7/1990 |
| GB | 2299562 | 10/1996 |
| GB | 2299562 A * | 10/1996 |
| WO | 94/01325 | 1/1994 |
| WO | 2004/092520 | 10/2004 |
| WO | 2004/099608 | 11/2004 |
| WO | 2006/076018 | 7/2006 |
| WO | 2006/106223 | 10/2006 |

OTHER PUBLICATIONS

Laurent Libeaut; International Search Report and Written Opinion issued in priority International Application No. PCT/GB2010/000475; Apr. 15, 2011; 9 pages; European Patent Office.

James Paddock; Combined Search and Examination Report issued in priority Great Britain Application No. GB0904871.1; Jul. 20, 2009; 7 pages; Great Britain Intellectual Property Office.

David Bradley; International Search Report and Written Opinion issued in priority International Application No. PCT/GB2010/000493; Apr. 15, 2011; 10 pages; European Patent Office.

United States Patent and Trademark Office, Office Action issued in U.S. Appl. No. 13/256,567, dated May 15, 2014, 14 pages.

* cited by examiner

HINGED CONNECTION APPARATUS FOR SECURING A FIRST WIND TURBINE COMPONENT TO A SECOND

The invention relates to a wind turbine blade having a hinged connection apparatus for connecting a first wind turbine blade component to a second, in particular where one of the first and second components is a wind turbine blade body and the other is the control surface, such as an aileron, of the wind turbine blade.

A typical horizontal axis wind turbine is illustrated in FIG. 1 to which reference should now be made. FIG. 1 illustrates a wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a shaft (not shown) extending from the nacelle front. The wind turbine illustrated in FIG. 1 may be a small model intended from domestic or light utility usage, or may be a large model, such as those that are suitable for use in large scale electricity generation on a wind farm for example. In the latter case, the diameter of the rotor could be as large as 100 meters or more.

The blades of a wind turbine generator are designed to extract energy from the incident wind. The profile of the wind turbine blade is therefore an aerofoil, the shape of which results in a pressure difference on one side of the blade compared to other as the wind blows. As a result of the pressure difference the blade is turned around a central rotor hub causing rotation of the generator shaft and production of electricity.

Many models of wind turbine blades also comprise flaps or ailerons 7. As shown in FIG. 1, these control surfaces are located at what is the trailing edge of the blade as the blade rotates under the influence of the wind. The angle at which the part of the blade surface made up by the flap or aileron 7 meets the rest of the blade surface can be adjusted to alter the aerodynamic characteristics of the blade's interaction with the wind. Flaps and ailerons are used in wind turbines with pitch control, and are used both to optimise the lift provided by the incident wind, and spill the wind if they generator is reaching overload. Both of these functions are critical to the everyday operation of wind turbines, and reliable operation of the ailerons and flaps is crucial for efficient and continued energy generation.

As with all wind turbine components, ease of installation and maintenance are important considerations. This is especially true for control surfaces such as ailerons or flaps, which are subject to constantly varying loads and stresses along their length, due to the incident wind pressure, environmental factors such as ice or accumulation of other undesirable matter, and the effect of their weight as they rotate around the central hub. Furthermore, they are subject to harsh environmental conditions, such as lightning strikes, wind, ice, and sea salt. Nevertheless, these control surfaces must remain capable of responding quickly to instructions from the wind turbine pitch control system to provide minute changes in angle of the control surface. There is an additional complication in that once installed, a repair engineer may only have access to the ailerons or flaps on site, many tens of meters above the ground and in some cases sea.

We have therefore appreciated that there is a need for control surfaces, such as ailerons or flaps, that can be easily attached to the wind turbine blade, for the purposes of installation, repair or replacement. We have also appreciated that given the rigours of the day-to-day operational of ailerons and flaps, any connection or actuation system should be able to withstand the harsh environmental conditions in which they are required to operate.

SUMMARY OF THE INVENTION

According to the invention, there is provided a wind turbine blade comprising a hinged connection apparatus for securing a first wind turbine blade component to a second wind turbine blade component, comprising: at least a first extendable hinge pin mounted in the first wind turbine blade component and moveable between a retracted and an extended position, for engaging, in said extended position with a hinge recess in the second wind turbine blade component; a positioning element for moving the hinge pin between said retracted and said extended position; and a locking mechanism for locking the hinge pin in at least said extended position.

The hinge pins for attaching the wind turbine blade components to each other are therefore provided internally in at least one of the components. This allows the hinge pins to be pre-installed and transported as part of a unit, which once on-site allows the wind turbine blade components to be easily and reliably installed and repaired.

Advantageously, the first wind turbine blade component comprises a hinge housing in which the hinge pin is releasably mounted. This allows the hinge pin to be easily installed in or removed from the wind turbine blade component as required. It will be appreciated that in the retracted position the hinge pin may be entirely or partially received in the hinge housing.

Further advantageously, the hinge pin is retained entirely within the hinge housing of the first wind turbine blade component in its retracted position. This protects the hinge pin when the wind turbine component is not yet installed, and allows the component to be easily positioned against the opposing wind turbine blade component at installation.

Furthermore, the hinge housing advantageously comprises a slot. The positioning element can then be provided as a fastener, mountable on the hinge pin such that it extends though the slot to the outside of the hinge housing. This allows an installation engineer to manually grip the fastener and move the hinge pin between the retracted and extended positions.

The fastener may have a screw thread, for tightening the fastener against the slot and providing the locking mechanism.

In an alternative embodiment to that mentioned above, the positioning element of the hinge pin may comprise a linear actuator for moving the hinge pin between its retracted and extended position in the hinge housing. This facilitates installation for locations where it is not straightforward for an engineer to be working directly on the blades.

In one example of the invention, the first and second wind turbine components each comprise a hinge edge, the hinge edge comprising:
one or more hinge knuckles in which the hinge housing or hinge recess is formed; gaps between the hinge knuckles so that the hinge knuckles of the first and second components can be positioned adjacent one another in a co-axially linear arrangement. This allows a large flap to be securely connected to the blade at a plurality of hinge points.

Preferably, the hinge edge of the first and second wind turbine blade components are arranged such that, when attached, the surface formed by the joining of the first and second wind turbine components is a flush surface. This prevents the hinge knuckles from adversely affecting the aerodynamic properties of the hinge.

In one embodiment, the first wind turbine blade component is the control surface of a wind turbine blade, and the second wind turbine blade component is a wind turbine blade body. In an alternative embodiment the first wind turbine component is a wind turbine blade body, and the second wind turbine component is the control surface of the wind turbine blade.

Preferably, the apparatus comprises a first connector portion, located on the hinge pin, for engaging with the first wind turbine blade component; a second connector portion, located on the hinge pin, for engaging with the second wind turbine blade component; and a rotating element for rotating the first connector portion with respect to the second, and for thereby rotating the first wind turbine blade component surface with respect to the second.

The rotating element of the hinge pin therefore also serves as the rotary actuator for rotating the first wind turbine component with respect to the second. This removes the need for additional actuators to be provided, and means that the wind turbine blade components are designed to take advantage of limited space.

In one embodiment the rotating element may be a rotational motor located between the first and second connector portions, and in another the rotating element may be a piezoelectric torsional element provided between the first and second connector portions on the hinge pin.

According to the invention, there is also provided a wind turbine blade aileron for attachment to a wind turbine blade comprising: at least a first extendable hinge pin mounted in the aileron and moveable between a retracted and an extended position, for engaging, in said extended position with a corresponding hinge recess in said wind turbine blade; a positioning element for moving the hinge pin between said retracted and said extended position; and a locking mechanism for locking the hinge pin in at least said extended position.

BRIEF DESCRIPTION OF THE DRAWINGS

Preferred embodiments of the invention will now be described by way of example, and with reference to the drawings, in which.

DETAILED DESCRIPTION

A first example of the invention will now be described with reference to FIGS. 2 and 3.

Figure 1:
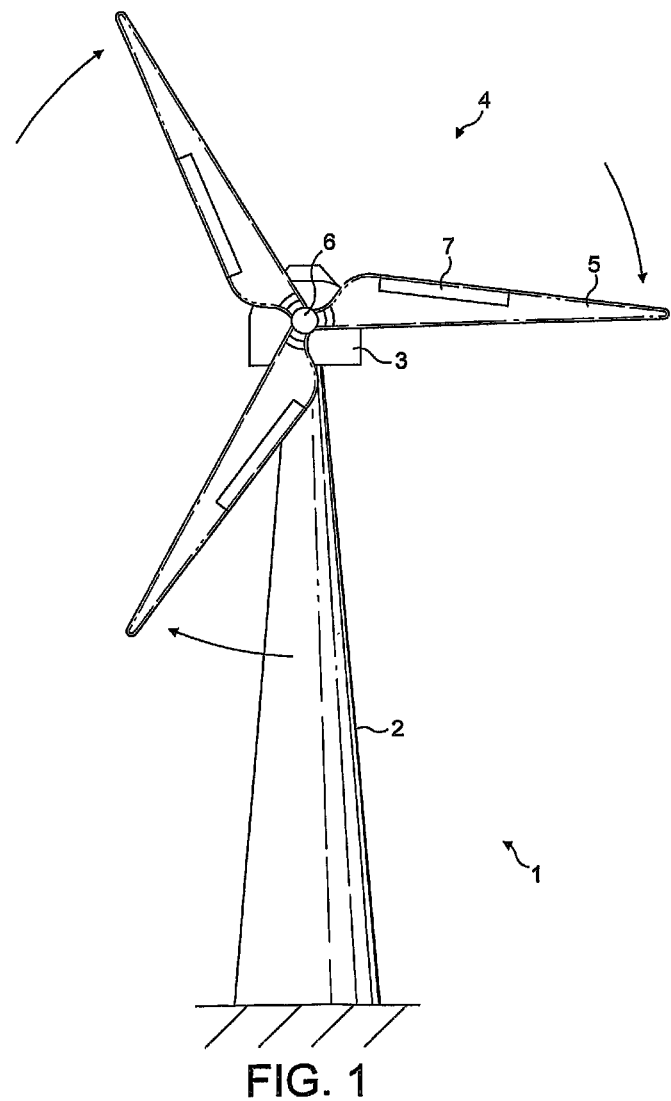
FIG. 1 is an elevation view of a wind turbine.
Figure 2:
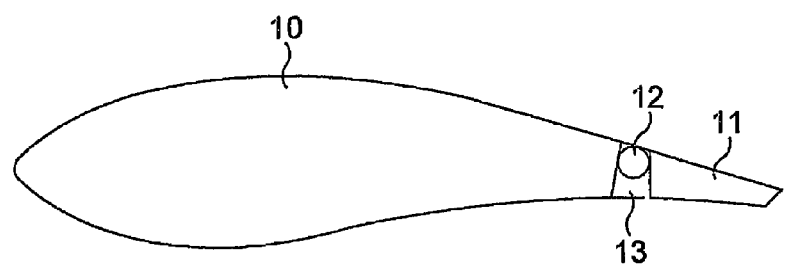
FIG. 2 is a lateral cross-section illustrating a first example of the invention.

FIG. 2 is a lateral cross-section through the blade, showing both a blade 10 and a control surface 11, otherwise known as a flap or aileron. The control surface 11 is joined to the blade 10 by a hinge mechanism 12 having hinge cylinders or knuckles, and hinge pins. The axis about which the hinge rotates is positioned just below the surface of the blade, so that the surface of the hinge cylinder is flush with the blade surface thereby avoiding disruption of the air flow across the surface of the blade. Alternatively, the hinge cylinder could also be located so that it is entirely under the blade surface, providing this still allows control of the aileron in the manner desired.

The top surface of the blade 10 is configured to contiguously join the hinge cylinder, or to cover it depending on the implementation. On the leeward side of the blade, a lip 13 extends from the blade 10 to partially cover the aileron 11, and maintain the aerodynamics of the desired flow of air.

Figure 3:
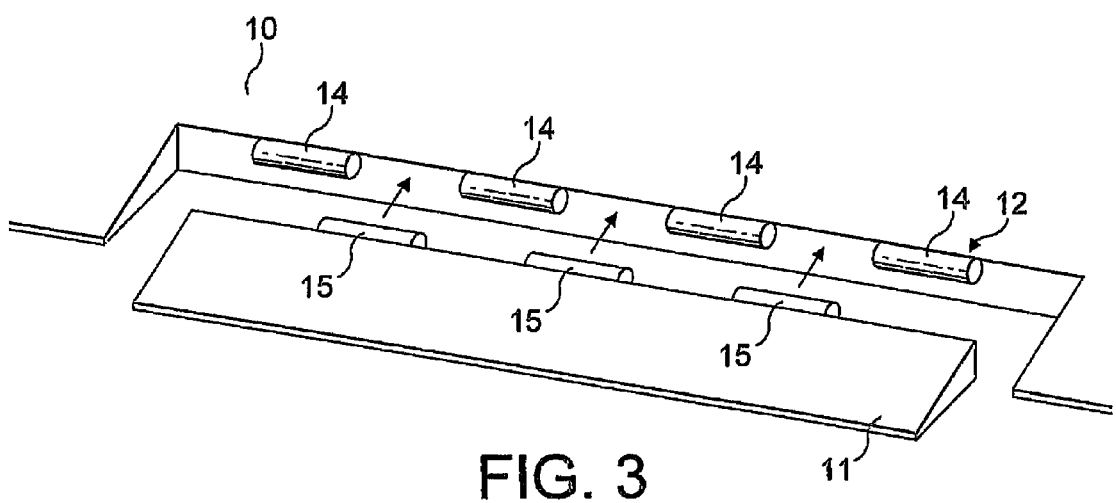
FIG. 3 is an elevation view of a first example of the invention.

FIG. 3 is an elevation view showing in more detail how the control surface 11 is connected to the blade body 10 via the hinge mechanism 12. The hinge mechanism comprises one or more hinge cylinders 15 mounted on the control surface, and one more hinge cylinders 14 mounted on the blade body. When the control surface is in the correct position for connection to the blade body, the hinge cylinders 15 of the control surface 11 fit in between those of the blade body 10 so that the hinge cylinders 14, 15 of both components are substantially coaxially aligned. The aligned hinge cylinders 14, 15 therefore form a hinge line 12 between the control surface 11 and the blade body 10. The end hinge cylinders of the hinge line may be placed on either the blade body or the control surface, but in a preferred example are located on the blade body 10. The hinge cylinders 14, 15 may be formed integrally to the blade body or control surface, as these components are manufactured, or may be formed separately and subsequently attached by a suitable bonding or welding method.

The hinge cylinders of the control surface and the blade body are joined together by extendable hinge pins, as will now be discussed in more detail and with reference to FIG. 4.

The hinge pins 16 are initially provided in a retracted position inside a hinge recess or hinge housing 17 of the hinge cylinders 15 of the control surface 11. In order to form the operational hinge mechanism it is necessary to extend the hinge pins from their retracted position, into an extended position, in which they engage with the hinge recesses of the neighbouring hinge cylinders 14 on the blade body 10. FIG. 4, shows a positioning element 18 provided in the form of a manual mechanism for extending the hinge pins. This positioning element comprises a fastener 18 mountably received in a bore on the hinge pin 16 to cooperate with a slot 19 in the hinge cylinder. When the hinge pin 16 is to be connected to the hinge cylinder of the blade body 10, an installation engineer can grasp the fastener 18 and slide the hinge pin 16 from its retracted position into its extended position.

Preferably, the fastener 18 is releasably attachable, by means of a screw thread or other mechanism, to the hinge pin 16. It is advantageous however if the fastener 18 is provided in the form of a locking screw, as by partially releasing the screw, the engineer can move the hinge pin 16, after which subsequently retightening the screw locks the hinge pin in place inside the control surface hinge cylinder 15. Thus, the fastener 18 can also act as a latch or locking mechanism. In this case, the slot 19 may be provided with cut-out portions for receiving the head of the fastener 18 when it is in a fully screwed down position, so that the fastener is flush in the slot 19 and correctly located with respect to the desired linear position of the hinge pin 16.

Alternatively, the positioning element 18 may comprise a tab formed of a resiliently compressible material so that the hinge pin 16 can be inserted into the hinge recess and removed from it with the tab still in place. In this case, a further retaining screw or bolt (not shown) may also be provided as a latch to secure the hinge pin in place in the extended position. The retaining screw or bolt preferably interacts with a corresponding recess (not shown) in the hinge pin 16. This separate latch in the form of a retaining screw or pin may also be provided in conjunction with the fastener shown in FIG. 4.

Alternatively, the positioning element may comprise a cavity or recess designed to receive a positioning tool. Preferably, this is a specially shaped tool designed to cooperate with the cavity or recess without slipping. A screw driver and a tubular or screw-head shaped recess is a simple example.

It will be appreciated that in alternative examples extending the pin from the retracted position to the extended position may be achieved by any suitable means. In the example described above, a manually operated mechanism is illustrated. Electrically actuated embodiments are also possible if preferred. In this case the positioning element can be an electrically operated linear actuator, voice coil actuator or motor, provided with its own latching or locking mechanism. The linear actuator may for example drive a rotating member against a screw thread in the hinge housing or recess 17 so that the hinge pin is moved longitudinally. Alternatively, the linear actuator or motor may simply extend an arm into the recess to act against a wall inside the hinge housing, and thereby push the hinge pin in the opposite direction. Electrical cables can be run through the hinge cylinders themselves, or through the body of the flap or blade as desired. The linear actuator may therefore be controlled remotely.

Figure 4:
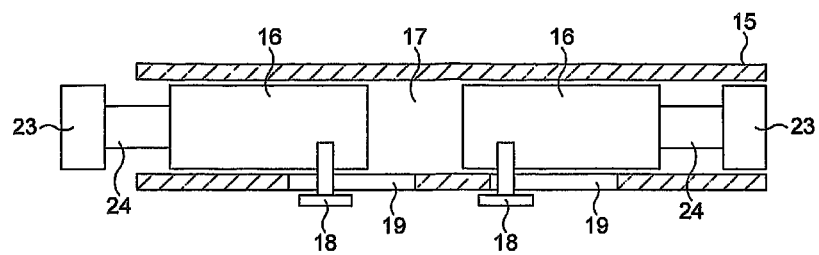
FIG. 4 is an elevation view of a hinge pin.

FIG. 4, shows two hinge pins 16, the leftmost pin is in a partially extended position, in which it lies partially inside the adjacent hinge cylinder 14 of the blade body 10, and provides a secure rotatable connection between the control surface and the blade body. The rightmost hinge pin is shown in a fully retracted position. Suitable actuator and control mechanisms for retaining and adjusting the angular position of the control surface 11 with respect to the blade body can be employed in accordance with practices known in the art.

The hinge pins have been described as initially provided in the hinge cylinders of the control surface. However, it will be appreciated that the interaction of the fastener 18 and slot 19 shown in FIG. 4, means that the pins are always retained at least partially inside the hinge cylinder, even when extended. This is advantageous, as it means that the control surface 11 and its means for connection with the blade body 10 can be provided as a single unit for easy installation. It is not then necessary for the engineer to install each hinge pin 16 in the respective hinge cylinder when the control surface is to be attached. It also means that the hinge pins 16 will not inadvertently become detached from the control surface 11 or blade body 10, while the engineer is working on the hinge mechanism for maintenance or repair. However, in the preferred example, as the positioning element 18 is detachable, the hinge pins 16 can still removed from the hinge cylinders and new hinge pins inserted, if such are required.

Although, the hinge pins 16 are preferably initially housed with the hinge cylinders 15 of the control surface, they may in alternative examples be housed in the hinge cylinders 14 of the blade body. In this case, the control surface can be mounted on the wind turbine blade body 10, by positioning it correctly with respect to the body, and subsequently extending the hinge pins 16 into the corresponding hinge cylinders of the control surface.

Although, in the examples above, the control surface 11 and blade body 10, have been described as connected by several hinge pins 16, it will be appreciated that in simple embodiments only two hinge pins 16 per control surface are required. An example of such an arrangement is later described in conjunction with FIG. 10.

A second example of the invention will now be described in which the hinge pins and their connection with the hinge cylinders is used as a rotary actuator for adjusting the angle of the control surface 11 relative to the blade body 10. The basic principle is that the hinge pin comprises connector portions for engaging with each of the hinge recesses in which the hinge pin is received, and a rotatable element, such as a motor or piezo-electrical torsional element, for rotating one connector portion with respect to the other. The rotation of the connector portions in turn rotates one wind turbine with respect to the other. The connector portions may be provided at either end of the hinge pin, with the hinge pin extending between them as this means that the connection of the hinge pin to the hinge recesses in the adjacent wind turbine components can be achieved most easily. In other embodiments, it is also possible that one or more of the connector portions are located at an intermediate position along the length of the hinge pin.

Figure 5:
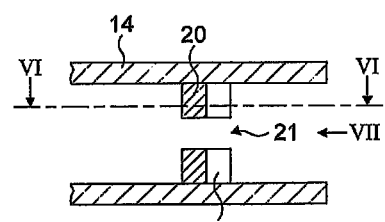
FIG. 5 is a side cross-sectional view through a hinge cylinder having a hinge recess for receiving the hinge pin of an adjacent hinge cylinder.
Figure 6:
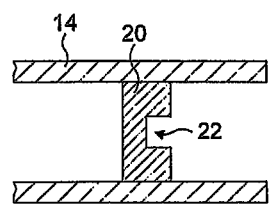
FIG. 6 is a cross-sectional view through the hinge cylinder having a hinge recess for receiving the hinge pin of an adjacent hinge cylinder, as shown in FIG. 5 along line VI-VI.
Figure 7:
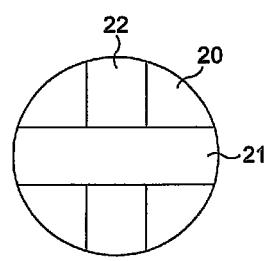
FIG. 7 is a end view into a hinge cylinder having a hinge recess for receiving the hinge pin of an adjacent hinge cylinder, as shown in FIG. 5 as direction VII.

An example embodiment of such an actuator will now be described in more detail. As shown in FIGS. 5, 6 and 7, the hinge cylinders 14 provided on the blade body 10 of this embodiment are provided with opposing stops or shoulders 20. These limit the extent to which the hinge pins 16 can extend into the hinge recess 17 of the hinge cylinders 14 of the blade body, and therefore reduce the operational forces on the tab and retaining screws. The stops or shoulders 20 are shown to leave an intermediate space 21 between them at the centre of the hinge cylinder 14, though they could equally be provided as a plate that closes the hinge cylinder entirely. The space 21 is useful for the threading of cables, should these be required.

Figure 8:
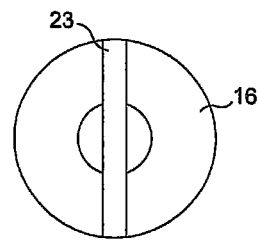
FIG. 8 is an end view of the hinge pin shown in FIG. 4.

The stops or shoulders 20 are provided with a central groove 22 for receiving a corresponding rod-shaped actuator pin 23 provided at the end of the hinge pin 16. This is shown in FIG. 8. When the hinge pin 16 is extended and the actuator pin 23 is received in the groove 22, the orientation of the control surface 11 and blade body 10 are fixed with respect to one another. The two components can no longer rotate independently as this would require the actuator pin 23 moving out of the groove 22, which is prevented by locking the hinge pin in place using the latch 18.

Although, the actuator pin 23 is illustrated here as being rod shaped, any actuator pin shapes that do not permit rotational movement with respect to the recess in which they are received would be suitable. Examples are shapes with straight edges and rotational symmetry, such as squares, other polygons, and stars. It will be appreciated that the actuator pin 23 and groove 22 form one of the connector portions mentioned above based on a plug and socket arrangement. Other more conventional plug and socket arrangements may therefore be used, according to the implementation.

In FIG. 4, the positioning and locking mechanism provided by fastener 18 forms the other connector portion. Rotational movement of the actuator pin 23 relative to the fastener 18 can therefore be used to induce relative rotational movement between the hinge cylinder 14 on the blade body and the hinge cylinder 15 on the control surface 11. Assuming that the movement of the actuator pins 23 in each hinge cylinder in the hinge line is coordinated, this results in angular movement of the control surface to the blade body. An electrical control system (not shown) may be provided in order to do this.

In the example shown in FIG. 4, the rotatable element is provided by section 24 of the hinge pin 16 on which the actuator pin 23 is mounted. The rotatable section 24 is a piezo electric torsional element. This is an electro-mechanical device in which a shearing motion can be induced if a current is supplied. In FIG. 4, the necessary electrical cables, wires and connections are omitted for clarity. Under the influence of a current, the piezo electric element twists around its central longitudinal axis, applying a torque to one connector portion relative to the other. As a result, the positioning element 18 pushes against the groove 19, while the actuator pin 23 pushes against the groove 22 and relative rotation of the control surface to the blade results. Contact ridges or flanges for providing a lip of flange against which the twisting hinge pin 16 can push may also be provided if desired, to reduce the strain on the fastener 18. Although the section 24 is shown as a separate component of the hinge pin 16 in FIG. 4, the entire hinge pin 16 may be provided as a piezo-electric torsional element if desired.

In alternative embodiments materials that change their shape according to external stimuli, such as shape memory alloys and shape memory polymers.

Figure 9:
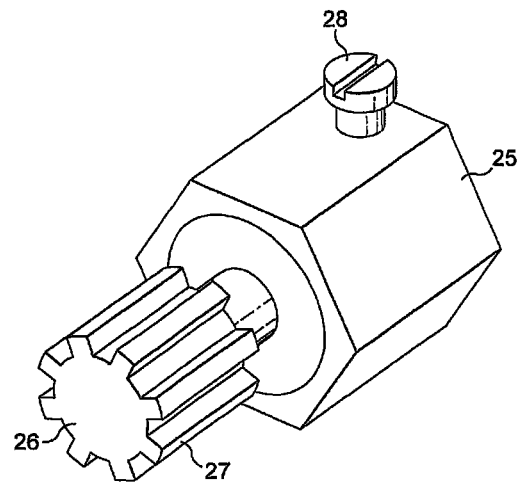
FIG. 9 is an isometric view of a motorised rotational actuator.

In a second example, the movement of the actuator pin is produced by mounting the actuator pin on a motorised rotary actuator. An example of this is shown in FIG. 9.

In this case, the actuator pin has a different shape to that shown in FIGS. 4 and 8 and comprises a splined coupling 26 having eight vertices 27 for engaging with the connection shoulder 29 in the adjacent hinge cylinder. The splined coupling 26 is part of a shaft received in a motor body 25. The motor body 25 comprises a motor for turning the shaft, and the splined coupling, with respect to the motor body 25. The contact ridges mentioned above with reference to the hinge pin 16 can be seen more clearly here in the shape of the motor body. Particularly, the motor body 25 has flat faces that cooperate with the interior of the hinge recess 17 in the control surface 11. This prevents the motor body rotating as a reaction to the driving force it is applying through the coupling 26 to the connection shoulder. Further, the motor body 25 may be made of an electrically non-conductive composite material and coated with a friction reducing material such as polytetrafluoroethylene PTFE. The motor body 25, drive shaft and splined coupling 26 therefore serve the function of the hinge pin 16 described above.

Figure 10:
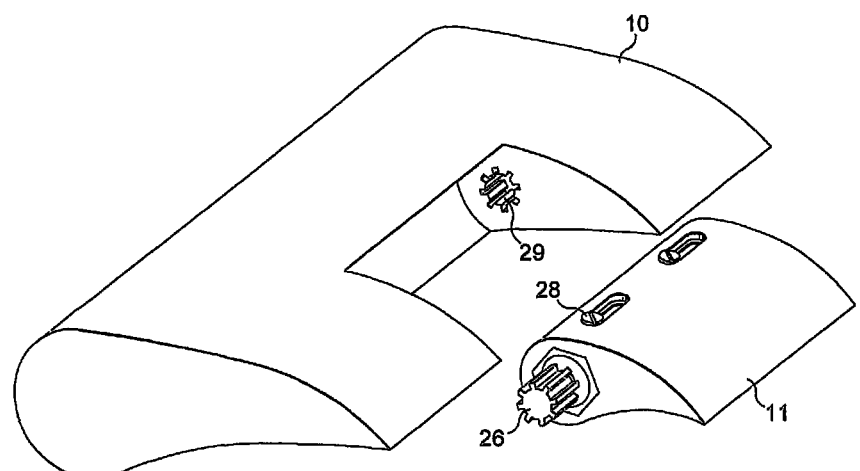
FIG. 10 is an isometric view of a second embodiment involving the motorised actuator.

A retaining screw 28 is provided on the motor body 25 to allow the motor to be moved between its extended and retracted position and also retained in position. As above, the retaining screw 28 can be moved in a slider slot. An illustration of this example is shown in FIG. 10. The retaining screw therefore acts as the positioning member and the locking mechanism described above.

A single control surface 11 is provided having two extendable hinge pin rotary motors 25. The shape of the control surface 11 is designed to mesh with a complimentary recess on the blade body 10 so that it can easily be slid into place for installation, and easily removed for repair. The splined coupling 26 can also be seen to engage with a connection shoulder, in the shape of a complimentary splined hole 29 on the blade body 10, so that as the motor actuator turns, the control surface is moved relative to the blade.

The rotary motors may be a rotary type piezo motor, similar to that described above, a rotary pneumatic cylinder, or a gearbox based DC motor. Furthermore, in examples of the invention the motor may have a feedback device such as an encoder for closed loop control of position and velocity.

In the above examples, the latch or locking mechanism and positioning element described have been manually operated. If electrical actuators and latches are provided, these may comprise solenoid activated brakes that engage with the interior wall of the hinge recess. This provides a high stall torque for withstanding the aerodynamic pressure on the flap at the required position.

Figure 11:
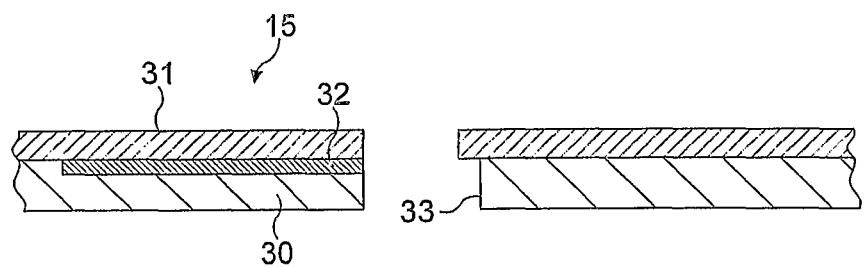
FIG. 11 is a cross-sectional view of the hinge housing showing its configuration in more detail.
Figure 11:
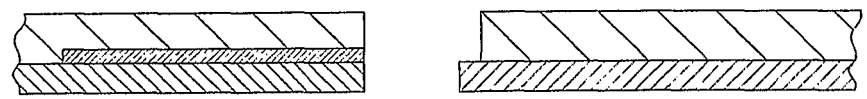

As illustrated in FIG. 11, which shows the hinge housing 15 without the hinge pin in situ, the hinge housing 15 has an interior portion 30 and an exterior portion 31. Preferably, the interior portion 30 is made of a glass fibre composite material that is fatigue resistant and electrically non-conductive. The exterior 31 of the hinge housing on the other hand is preferably electrically conductive. In this way, any electrical cabling and indeed the hinge pin and actuator itself can be housed in the hinge recess and electrically isolated. This provides protection against lightning which frequently strikes wind turbine blades in operation due to their height and often exposed position. If the cables are to be taken through the flap or blade body, then it is preferred if the region of the flap and blade through which they pass is electrically shielded, by installing an electrically conductive skin material.

Figure 12:
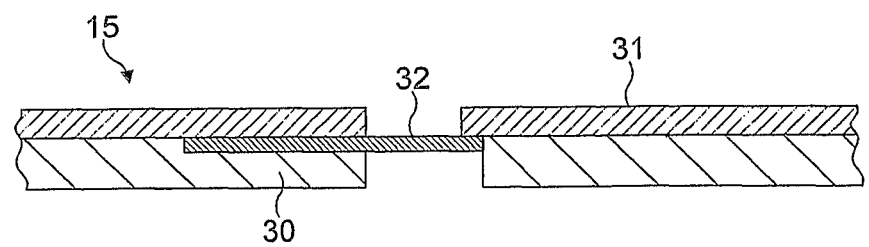
FIG. 12 is a further cross-sectional view of the hinge housing.
Figure 12:
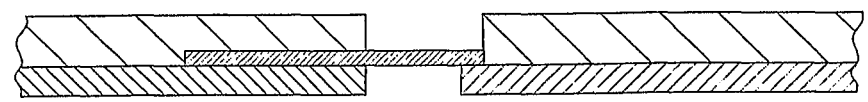

Additionally, an extendable conductive or non-conductive sleeve 32 may be provided to bridge the gap in-between one hinge housing and another to protect the hinge pin and actuators when they are in the extended position. The sleeve 32 can be provided in the hinge housing as a separate extendable portion that can be extended by suitable means, screw, tab or actuator (not shown) to extend slightly inside the cylinder of the neighbouring cylinder. A shoulder or stop 33 may be provided in the neighbouring hinge housing to accommodate the sleeve 32. FIG. 12 shows the sleeve 32 in an extended position.

In FIG. 10, a single aileron 11 is shown formed as a rotatable trailing edge in the blade body. It will be appreciated that a plurality of such ailerons may also be used on a single blade. Furthermore, the control surface is not limited to an aileron, but may be any moveable part of a wind turbine blade, whether located at the trailing edge, the leading edge or otherwise. In other examples, it may be any other moveable part of a wind turbine component.

In addition, although in the embodiments above the rotary actuator has been used to introduce rotation about a longitudinal axis, in alternative embodiments rotation in a different direction may be introduced, such as by bending in the longitudinal direction of the hinge pin 16. In a simple embodiment, this may be achieved by using a longitudinally orientated piezo electric element, such as a bimetallic strip, rather than the torsional element.

Although the description above discusses various examples of the invention, these examples are intended only to be illustrative and not to limit the scope of protection as it is defined by the claims. For example, the rotary actuator may be provided in embodiments in which the hinge pin is or is not extendable. Further, it will be appreciated that as the examples are related in the function and structure, features of one example may be useful incorporated into the embodiments of the other examples.

The invention claimed is:

1. A wind turbine blade comprising a hinged connection apparatus for securing a first wind turbine blade component to a second wind turbine blade component, comprising:
   at least a first extendable hinge pin mounted in the first wind turbine blade component and moveable between a retracted and an extended position for engaging in said extended position with a hinge recess in the second wind turbine blade component;
a positioning element for moving the hinge pin between said retracted and said extended position; and
a locking mechanism for locking the hinge pin in at least said extended position.

2. The wind turbine blade of claim 1, wherein the first wind turbine blade component comprises a hinge housing in which the hinge pin is releasably mounted.

3. The wind turbine blade of claim 2, wherein the hinge pin is retained entirely within the hinge housing of the first wind turbine blade component in its retracted position.

4. The wind turbine blade of claim 2, wherein the hinge housing comprises a slot, and the positioning element is a fastener, mountable on the hinge pin such that it extends through the slot to the outside of the hinge housing.

5. The wind turbine blade of claim 4, wherein the fastener has a screw thread for tightening the fastener against the slot and providing the locking mechanism.

6. The wind turbine blade of claim 1, wherein the positioning element of the hinge pin is a linear actuator for moving the hinge pin between its retracted and extended position in the hinge housing.

7. The wind turbine blade of claim 1, wherein the first and second wind turbine blade components each comprises a hinge edge, the hinge edge comprising:
one or more hinge knuckles in which the hinge housing or hinge recess is formed;
gaps between the hinge knuckles so that the hinge knuckles of the first and second components can be positioned adjacent one another in a coaxially linear arrangement.

8. The wind turbine blade of claim 7, wherein the hinge edges of the first and second wind turbine blade components are arranged such that, when attached, the surface formed by the joining of the first and second wind turbine blade components is a flush surface.

9. The wind turbine blade of claim 1, wherein the first wind turbine blade component is the control surface for a wind turbine blade and the second wind turbine blade component is a wind turbine blade body.

10. The wind turbine blade of claim 1, wherein the first wind turbine blade component is a wind turbine blade body and the second wind turbine blade component is the control surface for a wind turbine blade.

11. The wind turbine blade of claim 1, comprising:
a first connector portion, located on the hinge pin, for engaging with the first wind turbine blade component;
a second connector portion, located on the hinge pin, for engaging with the second wind turbine blade component; and
a rotating element for rotating the first connector portion with respect to the second, and for thereby rotating the first wind turbine component surface with respect to the second.

12. The wind turbine blade of claim 11, wherein the rotating element is a rotational motor located between the first and second connector portions.

13. The wind turbine blade of claim 11, wherein the rotating element is a piezo-electric torsional element provided between the first and second connector portions on the hinge pin.

14. A wind turbine blade aileron for attachment to a wind turbine blade comprising:
at least a first extendable hinge pin mounted in the aileron and moveable between a retracted and an extended position for engaging in said extended position with a corresponding hinge recess in said wind turbine blade;
a positioning element for moving the hinge pin between said retracted and said extended position; and
a locking mechanism for locking the hinge pin in at least said extended position.

* * * * *